(12) United States Patent
Wang et al.

(10) Patent No.: US 8,433,920 B2
(45) Date of Patent: Apr. 30, 2013

(54) METHOD AND SYSTEM FOR AUTHENTICATING RELIABLE BIOMETRIC DATA

(75) Inventors: Yige Wang, Natick, MA (US); Shantanu D. Rane, Cambridge, MA (US); Anthony Vetro, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 768 days.

(21) Appl. No.: 12/570,072

(22) Filed: Sep. 30, 2009

(65) Prior Publication Data

US 2010/0077278 A1    Mar. 25, 2010

Related U.S. Application Data

(63) Continuation-in-part of application No. 11/928,687, filed on Oct. 30, 2007, which is a continuation-in-part of application No. 11/564,638, filed on Nov. 29, 2006, now Pat. No. 7,779,268, which is a continuation-in-part of application No. 11/218,261, filed on Sep. 1, 2005, now Pat. No. 7,620,818, which is a continuation-in-part of application No. 11/006,308, filed on Dec. 7, 2004, now abandoned.

(51) Int. Cl.
*G06F 21/00* (2006.01)
*G06K 9/00* (2006.01)
*H03M 13/00* (2006.01)

(52) U.S. Cl.
USPC ............................ 713/186; 382/115; 714/785

(58) Field of Classification Search ............... None
See application file for complete search history.

(56) References Cited

U.S. PATENT DOCUMENTS 6,038,315 A * 3/2000 Strait et al. ............ 713/183
6,959,874 B2 * 11/2005 Bardwell ............... 235/493
2005/0238207 A1 * 10/2005 Tavares ................. 382/115

FOREIGN PATENT DOCUMENTS

EP         2128819 A1 * 12/2009

OTHER PUBLICATIONS

Liveris et al Compression of Binary Sources With Side Information at the Decoder Using LDPC Codes Angelos D. Liveris, Student Member, IEEE, Zixiang Xiong, Senior Member, IEEE, and Costas N. Georghiades, Fellow, IEEE Communication Letters, vol. 6, No. 10, Oct. 2002).*

(Continued)

*Primary Examiner* — Philip Chea
*Assistant Examiner* — Fatoumata Traore
(74) *Attorney, Agent, or Firm* — Dirk Brinkman; Gene Vinokur (57) ABSTRACT

A method for authenticating biometric data. Comprising of a processor that measures the reliability of each bit in enrollment biometric data; by arranging the bits; encoding the enrollment biometric data in the decreasing order to produce an enrollment syndrome; arranging the bits in the authentication biometric; decoding the authentication enrollment syndrome to produce an estimate of the enrollment biometric data; generating an output signal indicating that the estimate of the authentication biometric data is substantially the same as the enrollment biometric data.

14 Claims, 5 Drawing Sheets

OTHER PUBLICATIONS

Tong Zhang Keshab K Parhi, Joint 3, K—An FPGA Implementation of (3, 6)-Regular Low-DensityParity-Check Code Decoder, EURASIP Journal on Applied Signal Processing 2003:6, 530-542).*
(Simon Liu and Mark Silverman , A practical Guide to Biometric security Technology, IEEE 2001.*
Juels et al., "A Fuzzy Vault Scheme," in IEEE Intl. Symp. on Information Theory, 2002.

Lunglmayr et al., "Optimized Mapping Schemes for LDPC Coded Higher Order Modulated QAM Transmission," Infineon Technologies AG, AM Campeon 1-12, D-85579 Neubiberg, Germany; EUROCAST 2007, LNCS 4739, pp. 952-959 2007.

* cited by examiner

| Scheme | FRR | FAR | SAR |
|---|---|---|---|
| Unordered feature bits Equal initial LLR Standard BP decoding | 0.11 | $1.19 \times 10^{-4}$ | Not Applicable since equal initial LLRs |
| Unordered feature bits Unequal initial LLR Standard BP decoding | 0.099 | $2.15 \times 10^{-6}$ | $4.37 \times 10^{-4}$ |
| Unordered feature bits Unequal initial LLR Shuffled BP decoding | 0.083 | $3.36 \times 10^{-6}$ | $5.00 \times 10^{-4}$ |
| Reliability-ordered bits Unequal initial LLR Standard BP decoding | 0.037 | $1.01 \times 10^{-6}$ | $4.30 \times 10^{-4}$ |
| Reliability-ordered bits Unequal initial LLR Shuffled BP decoding | 0.033 | $1.61 \times 10^{-6}$ | $5.41 \times 10^{-4}$ |

METHOD AND SYSTEM FOR AUTHENTICATING RELIABLE BIOMETRIC DATA

RELATED APPLICATION

This is a Continuation-in-Part application of U.S. Ser. No. 11/928,687, "Pre-processing Biometric Parameters before Encoding and Decoding," filed by Yedidia et al., on Oct. 30, 2007, which is a Continuation-in-Part application of U.S. application Ser. No. 11/564,638, "Biometric Based User Authentication and Data Encryption," filed by Draper et al., on Nov. 29, 2006 now U.S. Pat. No. 7,779,268, which is a Continuation-in-Part application of U.S. application Ser. No. 11/218,261, "Biometric Based User Authentication and Data Encryption," filed by Martinian et al., on Sep. 1, 2005 now U.S. Pat. No. 7,620,818, U.S. Publication 2006-0123241, which is a Continuation-in-Part application of U.S. application Ser. No. 11/006,308, "Biometric Based User Authentication with Syndrome Codes," filed by Martinian et al. on Dec. 7, 2004 now abandoned, U.S. Publication 2006-0123239, all incorporated herein by reference.

FIELD OF THE INVENTION

The invention relates generally to the fields of cryptography, and more particularly to acquiring, pre-processing, encoding, and storing biometric parameters for user authentication and data encryption.

BACKGROUND OF THE INVENTION

User authentication with biometric data (biometrics), e.g., speech, fingerprint, iris appearance is an alternative to conventional typed passwords. As an advantage, biometrics do not need to be memorized, and are difficult to replicate. However, biometrics are inherently noisy, and can have some variation over time. These makes biometric authentication less reliable than conventional password schemes.

That can be solved in part by storing reference biometrics accessible by an authentication device. Then, pattern matching can be used to compare current biometrics to be authenticated with the reference biometrics. However, that scheme can become a security threat when the reference biometrics are compromised.

Another way solves the problem by using "cancelable" biometrics, wherein the biometrics can be revoked at any time. However, it is difficult to guarantee security if the cancelable transformation can be compromised.

Another way to solve this problem is to use a "fuzzy vault," Juels et al., "A Fuzzy Vault Scheme," in IEEE Intl. Symp. on Information Theory, 2002. A value κ is encrypted using a set A. The value κ can be decrypted by a set B only if the set B substantially overlaps the set A, where the sets A and B can be ordered arbitrarily.

This is a form of error-tolerant encryption operation where keys are sets. Fuzzy vault uses a Slepian-Wolf coding error correction code (ECC). This is a type of distributed source coding wherein data are encoded independently by separate sources that cannot communicate with each other.

The ECC can correct the small variations in biometric data due to noise. Furthermore, the check bits of the ECC emulates the cryptographic hash of conventional password systems in that the check bits cannot be recovered. However, those schemes have a high false reject rates (FRR) because it is difficult to accommodate the time varying biometrics for a particular user. Therefore, it is difficult to design an ECC for that noisy channel.

The problem was partially remedied in the context of fingerprint biometrics by the related applications. There, after feature transformation of the fingerprint, the biometric channel is reduced to a binary symmetric channel (BSC), for which conventional ECC are available. Using Slepian-Wolf low-density parity check codes (LDPC) codes with 30 bits of security, that method achieves a FRR of 11% and a false acceptance rate (FAR) of 0.01%. However, for practical methods, the FRR-FAR tradeoff must still be improved.

SUMMARY OF THE INVENTION

The embodiments of the invention provide a method and system for applying an error correcting code (ECC) to biometric data. Only the check bits produced by the ECC are stored and accessible by an authentication device. For a given coding rate, the ECC attempts to correct errors when user authentication is attempted.

In particular, during feature extraction and authentication, feature bits are arranged according to a decreasing order of their reliabilities. The reliable bits are associated with high-degree variable nodes in the graph of the ECC. The reliability of a bit is measured at enrollment and used to initialize the ECC decoding. The reliability bits of any biometric data can be preferentially treated.

DETAILED DESCRIPTION OF THE PREFERRED EMBODIMENTS

System and Method Overview

Figure 1:
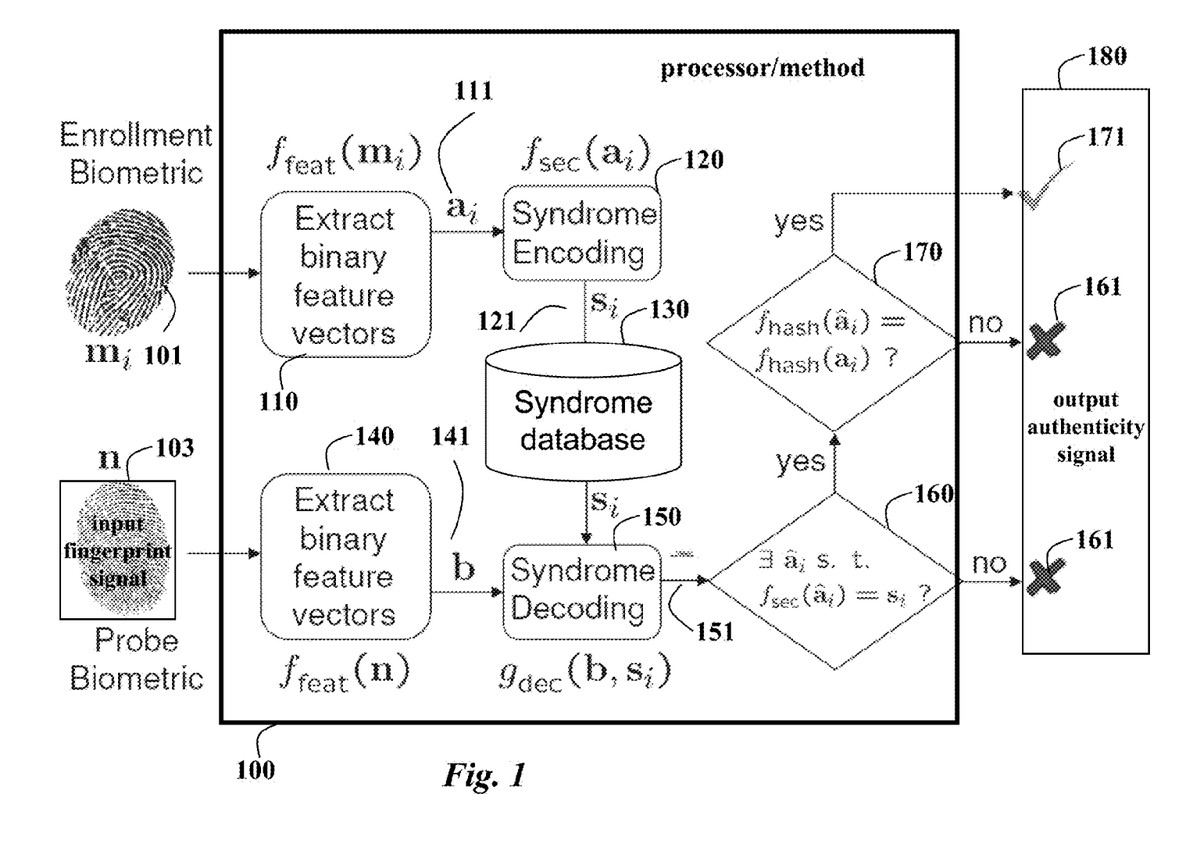
FIG. 1 is a block diagram of a system and method for authenticating users with biometric data according to embodiments of the invention.

FIG. 1 shows a computerized system and method for authenticating users with biometric data according to embodiments of the invention. The steps of the method can be performed in a processor 100, including memory and input/output interfaces as known in the art. During operation, the method takes biometric data as input and transforms the biometric data into a physical output, that is a signal indicating whether the biometric data are authentic 171, or not. The invention can be used for any biometric data, e.g., fingerprints, iris, face, odor, DNA, signature, speech.

Enrollment

During enrollment, each of M users provides known biometric data $m_i$ 101, e.g., a fingerprint. The function $f_{feat}(\ )$ extracts 110 a binary feature vector $a_{i,j}$ 111, for i=1, . . . , M, and j=1, . . . , N, where N is the length of the vector. The statistical requirement is that the feature vectors can be matched to an error correcting code as described below. Therefore, a function $f_{sec}(a_i)$ encodes 120 the vector as a secure syndrome $s_i$ 121 using an error correcting code (ECC)

C. The syndrome $s_i$, ECC C, and a cryptographic hash $f_{hash}$ ($a_i$) are stored in the database 130. As described in greater detail below, the bits in the vector $a_i$ are arranged in a decreasing order of their reliability before the encoding.

The encoding uses Slepian-Wolf coding to generate binary feature vectors that are independent and identically Bernoulli distributed with a parameter 0.5 (Bernoulli(0.5)) for the M different users. For the same user, slightly different biometrics are related by a binary symmetric channel (BSC) with a small crossover probability. The crossover probability is the likelihood that a bit is inverted ("flipped"). This ways, conventional ECC designs, such as low-density parity check codes (LDPC) codes can be used for the Slepian-Wolf coding of the feature vectors. The feature transformation is made public for others to use, and does not provide any security. The security is provided by the syndromes generated by the Slepian-Wolf encoder.

Authentication

During authentication, the unknown user provides an input signal 103 in the form of an unknown biometrics n. A feature vector b 141 is extracted 140 using $f_{feat}(n)$. The feature b is syndrome decoded 150 using $g_{dec}(b, s_i)$. The decoder assumes that the feature vector b is a reliable version of the enrollment feature vector $a_i$. The ECC decoding combines the secure syndrome $s_i$ and the vector b according to $g_{dec}(b, s_i)$.

In distributed source coding terminology, this is equivalent to Slepian-Wolf decoding of the syndrome $s_i$ using b as "side" information. The result is either an estimate $\hat{a}_i$ of the enrollment vector $a_i$, or a value $\emptyset$ indicating a decoding failure. It is possible that $\hat{a}_i \neq a_i$, yet $\hat{a}_i$ relates to the syndrome $s_i$.

Therefore, a first test determines 160 if there exist an estimate $\hat{a}_i$ such that $f_{sec}(\hat{a}_i)$ is substantially the same as $s_i$. If not, the failure $\emptyset$ is signaled 161. Furthermore, to protect against an imposter, the authentication succeeds 171 only if $f_{hash}(\hat{a}_i) = f_{hash}(a_i)$ 170.

In other words, the underlying input signal 103 (the biometric) is transformed into an output signal 151 indicating whether the biometric is authentic, or not.

The output signal can be used to provide secure access to a computer system, stored data, or a facility.

Statistical Properties of Feature Vectors

Bits in the vector $a_i$ are equally likely to be 0 or 1. That is, the entropy $$H(A_{i,j})=1 \text{ bit}$$

for all i and j. Here $A_{i,j}$ represents a random variable, and $a_{i,j}$ represents an actual vector.

Bits in the vector are independent of each other, that is:

$$H(A_{i,j},A_{i,k})=H(A_{i,j})+H(A_{i,k})=2 \text{ bits}$$

for all j≠k, i.e., we need at least two bits to represent a random vector $[A_{i,j}, A_{i,k}]$.

Feature vectors $A_i$ and $A_u$ from different users are independent, that is:

$$H(A_{i,j},A_{u,k})=H(A_{i,j})+H(A_{u,k})=2 \text{ bits}$$

for all i and u, and i≠u. i.e., we need at least two bits to represent a random vector $[A_{i,j}, A_{u,k}]$.

If vectors $A_i$ and $A'_i$ are from the same user, then the bits of the two vectors are statistically related by a BSC with a crossover probability of $p_{i,j}$, and $$H(A'_{i,j}|A_{i,j})=H(p_{i,j})$$

for all i and j. If $p_{i,j}$ is small, then the vector $A_{i,j}$ is tolerant to noisy.

Our secure biometric authentication has positive information theoretic security. The system is information theoretically secure even when an imposter has unlimited computing resources. In other words, for the syndrome $s_i$, $H(A_i|s_i)>0$. For ECC with an encoding rate R, $0<R<1$, the syndrome has $(1-R)N$ bits. The encoding rate R determines a tradeoff between security and level of noise.

Reliability Measures

The invention recognizes that biometric data for a specific user can vary over time. This makes biometric authentication less reliable than conventional password based systems. The invention also recognizes that some bits in the biometric data are more reliable than others. For example, the location of the minutia of a fingerprint can influence the reliability.

Therefore, during enrollment multiple samples of the biometrics are acquired, and the reliability of the various bits in samples (templates) is measured. Then, the reliable bits are given preferential treatment during enrollment and authentication to provide more consistent results.

The following factors can be considered to determine the performance metrics for biometric systems.

False accept rate or false match rate (FAR or FMR) measures incorrect matches to a non-matching template, i.e., it measures the percent of invalid inputs which are incorrectly accepted.

False reject rate or false non-match rate (FRR or FNMR) measures the probability that the system fails to detects a match between the input pattern and a matching template in the database, i.e., it measures the percent of valid inputs which are incorrectly rejected.

Receiver operating characteristic or relative operating characteristic (ROC) characterizes the trade-off between the FAR and the FRR. For example, the authentication uses a hard or soft decision based on a threshold, which determines how close to a template the input needs to be for it to be considered a match.

Equal error rate or crossover error rate (EER or CER) measures the rate at which both accept and reject errors are equal.

Failure to enroll rate (FTE or FER) measures the rate at which attempts to create a template from an input is unsuccessful. This is most commonly caused by low reliable enrollment biometrics.

Successful attack rate (SAR) is the probability that the ECC decoding recovers an enrollment feature vector given the stored syndrome and an illegitimate probe feature vector constructed by an imposter using some extra side information about the feature extraction process. For instance, the imposter may determine the transforms applied to the biometric to produce reliable bits in the feature vector. This is a more realistic measure of security than FAR.

Number of bits of security (NBS) measures the level of security. The NBS is the number of bits that an imposter must guess correctly to be authenticated for a particular syndrome and ECC parameters. If the feature vector satisfy the above statistical properties, then NBS=N−(1−R)N=RN.

Error Correcting Code

To optimize the tradeoff, we associate "reliable" bits of the feature vector with appropriate bits of the codeword of the ECC. To make the NBS large, the encoding is performed with a large coding rate, thereby generating a small number of syndrome bits. This increases the likelihood that a noisy but legitimate biometric probe cannot be decoded, thereby increasing the FRR.

For a particular coding rate R, the best tradeoff between FRR and FAR (or SAR) is achieved by a channel code that substantially approaches the channel capacity. By design, each bit in a legitimate authentication feature vector is related to the corresponding bit of the enrollment feature vector by the BSC. The reliability of the feature vector bit can be measured in terms of the crossover probability of the corresponding BSC. For the crossover probability p, and reliability R, $$\mathcal{R} = \left| \log\left(\frac{1-p}{p}\right) \right|. \quad (1)$$

The likelihood that a bit is not inverted increases with the coding rate R. We use the LDPC codes to demonstrate how the reliability information can be combined during the encoding to optimize the tradeoff.

Properties of LDPC Codes

Figure 2:
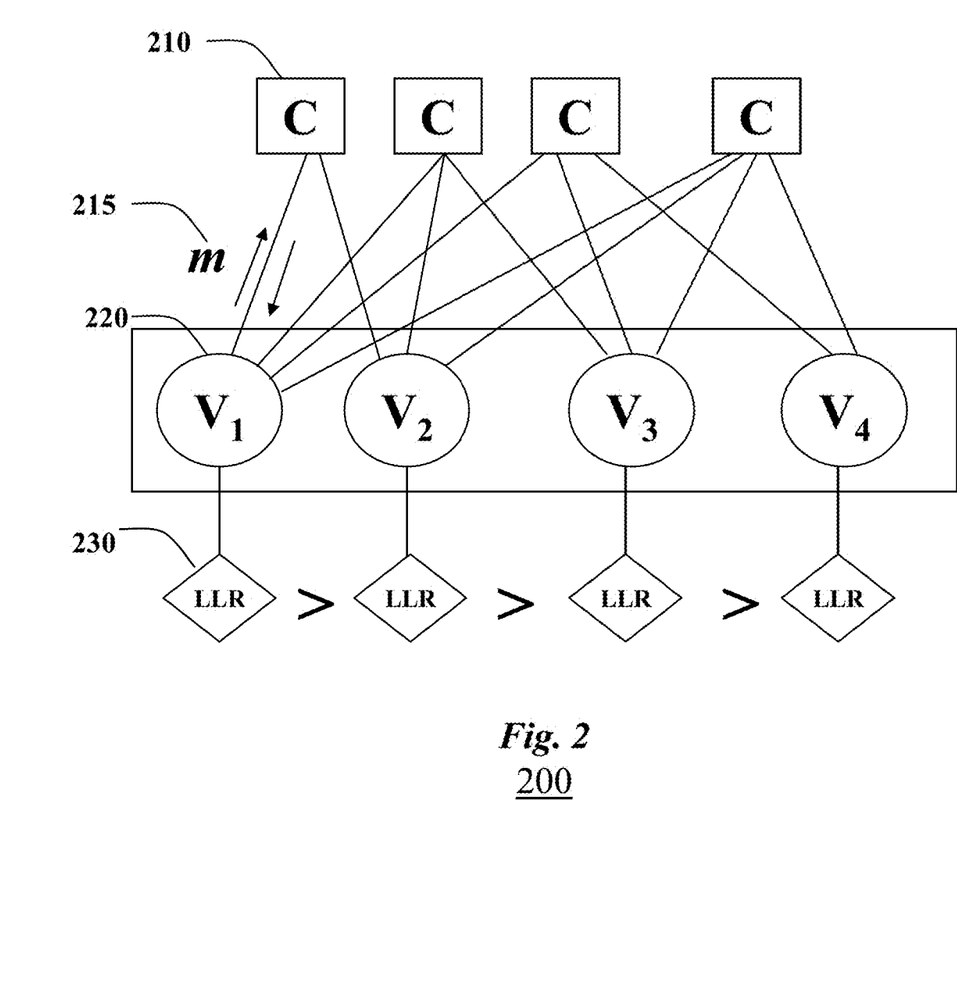
FIG. 2 is a factor graph for belief propagation decoder according to embodiments of the invention.

As shown in FIG. 2, an LDPC code can be represented by a bipartite graph 200. The factor graph includes parity check constraint nodes (C) 210, codeword bit variable nodes (V) 220, and log likelihood ratio (LLR) nodes 230. It is understood, that in practical applications the number of bits in a codeword can number into the thousands.

The number of check nodes connected to a variable node is the degree of that variable node, and indicates a level of reliability of the bit stored at the variable node. In the example shown, variable node $V_1$ is highly constrained, with a degree of 4, $V_2$ has a degree of 3, $V_3$ has a degree of 3, and $V_4$ has a degree of 2.

In general, LDPC codes can be regular or irregular codes. For irregular LDPC codes, all nodes do not have the same degree. We use irregular LDPC codes that approach the Shannon capacity with iterative decoding. Then, authentication involves Slepian-Wolf decoding of the syndrome with the probe feature vector as side information. Decoding is performed iteratively using belief propagation (BP). When BP decoding is used for irregular LDPC codes, high-degree variable nodes obtain more information from check nodes. Consequently, the bits in these nodes can be decoded more reliably. We exploit this property in our method.

The edges connecting the variable nodes to the constraint nodes are used for passing messages m 215. The beliefs of the bits at the variable nodes of codeword are updated by the messages.

Associating Reliable Bits with LDPC Codes

We measure the reliability of different bits extracted from biometric data. For example, the reliability of fingerprints depends on the location of the minutiae. The crossover probability $p_{i,j}$ can be determined during enrollment when multiple biometric samples, and hence multiple feature vectors, are extracted for each user. We arrange the bits in each feature vector $a_i$ in a increasing order of $p_{i,j}$, i.e., decreasing reliability. After the ordering, $j<k \Rightarrow p_{i,j} \leq p_{i,k}$ for all j, k. Then, the reliability $R_{i,j}$ can be determined using Equation (1). The reliabilities in the decreasing order have the property that $R_{i,j} \geq R_{i,k}$ for $j<k$.

The bits in the ordered feature vector bits are associated with variable nodes of the selected LDPC code graph such that highest-reliability bits are placed at the highest-degree variable nodes. Then, beliefs about reliable bits are propagated information quicker during the message-passing iterations of the BP decoding.

After the association between the bits of the vector bits and the bits of variable nodes, we can permute the variable nodes so that their indices agree with their corresponding feature vector bit indices. This permutation does not change either the code, or the performance.

Soft Initialization of LDPC Decoding

Following the above association of high-reliability bits with high-degree variable nodes, the decoding performance can be further improved with a soft-decision decoder that has the reliability of each bit of side information. At each iteration of BP decoding, the messages exchanged between variable nodes and check nodes often depend on the log likelihood ratios (LLR) 230. Because different bits of the feature vector have different reliability, each variable node is assigned a corresponding initial LLR at the start of decoding. That is, the LLR are also assigned to the variable nodes in a decreasing order.

The initial LLR of the $j^{th}$ variable node of user i is $L_{i,j}$. Now, the $j^{th}$ bit in the probe feature vector of user i is the output of the BSC with a crossover probability $p_{i,j}$, and reliability $R_{i,j}$ which are determined during enrollment.

During authentication, the initial LLR for each $j^{th}$ variable node for the probe feature vector b is set to $$L_j = \begin{cases} R_j & \text{if } b_j = 1 \\ -R_j & \text{if } b_j = 0, \end{cases}$$

where j is the index of a bit in the authentication biometric data b.

For secure biometric authentication of M users with N-bit feature vectors, MN reliabilities need to be stored, in addition to the M syndromes. In a practical alternative, we only store N reliabilities. After the arranging in decreasing order, the average crossover probability $\bar{p}_j$ for each bit position for all M users can be determined. The reliabilities $\bar{R}_j$ corresponding to the average crossover probabilities are obtained by substituting $p=\bar{p}_j$ in Equation (1), and store the N reliabilities $\bar{R}_j$. With these stored reliabilities, the BP decoding for any probe feature vector start by initializing the LLRs at the variable nodes using $$\bar{L}_j = \begin{cases} \bar{R}_j & \text{if } b_j = 0 \\ -\bar{R}_j & \text{if } b_j = 1. \end{cases}$$

The sign of the LLR depends on the vector b.

Figure 3:
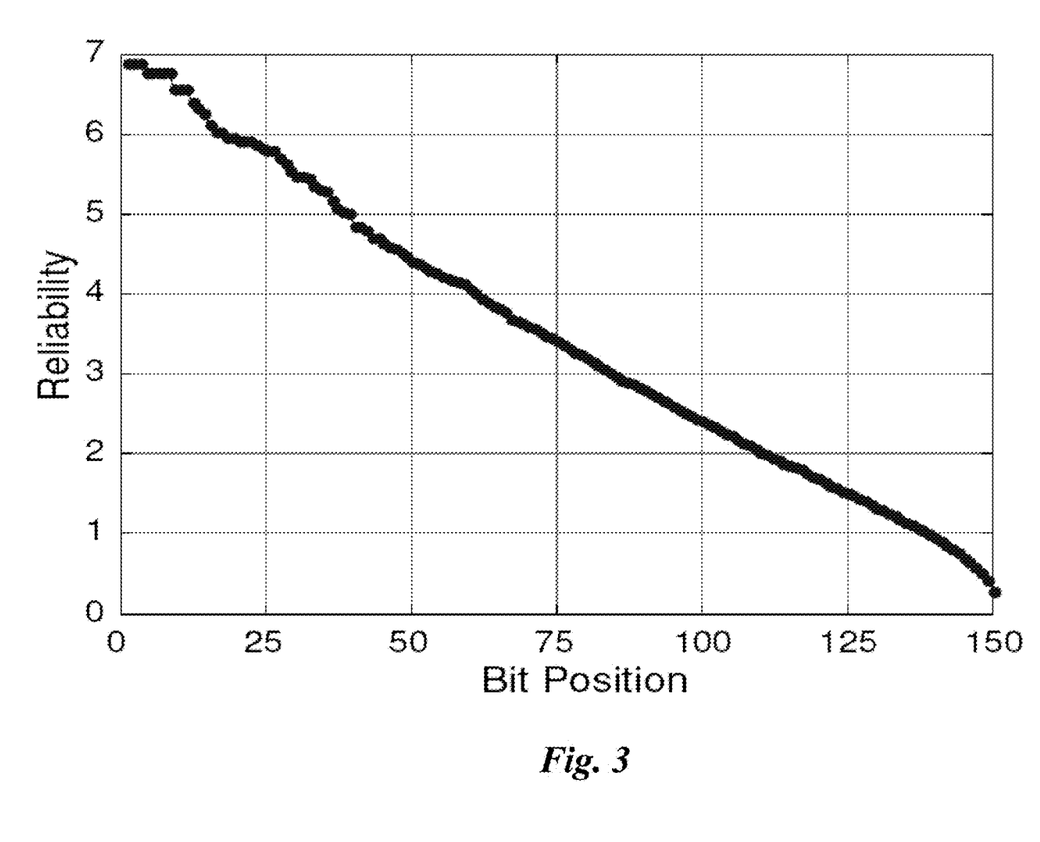
FIG. 3 is a graph of reliability of biometric data as a function of bit position.

FIG. 3 is a graph of the reliability as a function of bit position for a 150-bit codeword, in the decreasing order. Specifically, the magnitude of the LLR of the average crossover probabilities for each of the 150 bits is stored, and used to initialize the belief propagation decoding.

In other words, storing $\bar{R}_j$ does not reveal any information about whether a bit is more likely to be a 0 or 1. Even if the imposter knows the reliabilities, the correct order is still needed to recover the enrollment feature vector. Actually, the reliability information can improve security when the imposter provides the wrong bits in the reliable positions, which causes the decoding to fail.

Shuffled Belief Propagation

A conventional BP decoder often needs several hundreds of iterations to converge, which is not always realistic because of a high decoding delay. Furthermore, a large code length is difficult to implement in parallel hardware. Shuffled BP reduced the required number of iterations by judicious scheduling, which balanced parallel and serial operations so that nodes that are processed later can use information from previously processed nodes. The shuffled BP can reduce the number of iterations with the same performance. If the number of iterations remains the same, the decoding performance is usually improved.

EFFECT OF THE INVENTION

Figure 4:
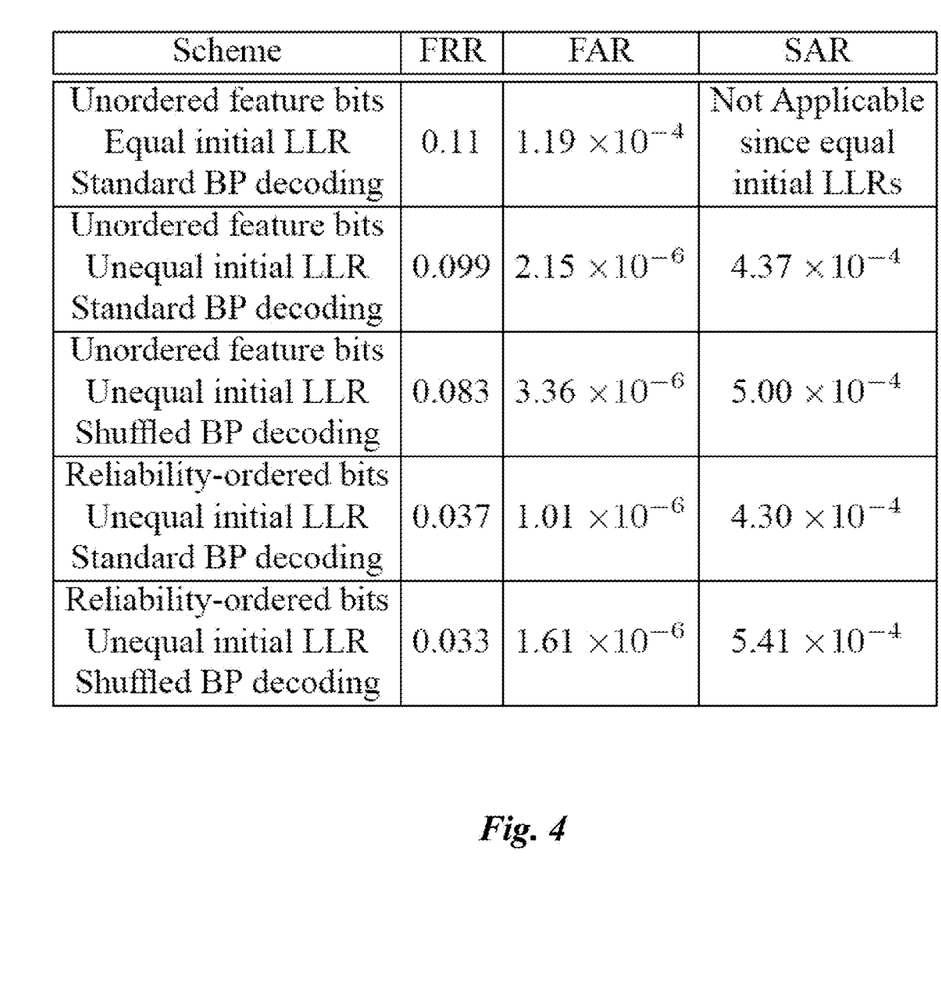
FIG. 4 is a table comparing performance metrics for authenticating biometric data.

FIG. 4 compares the FRR, FAR and SAR for ordered, unordered, equal and unequal initial LLR, and conventional and shuffled BP decoding. There is a reduction in the FRR from 11% to 3.3% when the reliabilities of the bits are considered along with reliability initialization. The corresponding FAR is also very small. The SAR is less than 0.06%.

Figure 5:
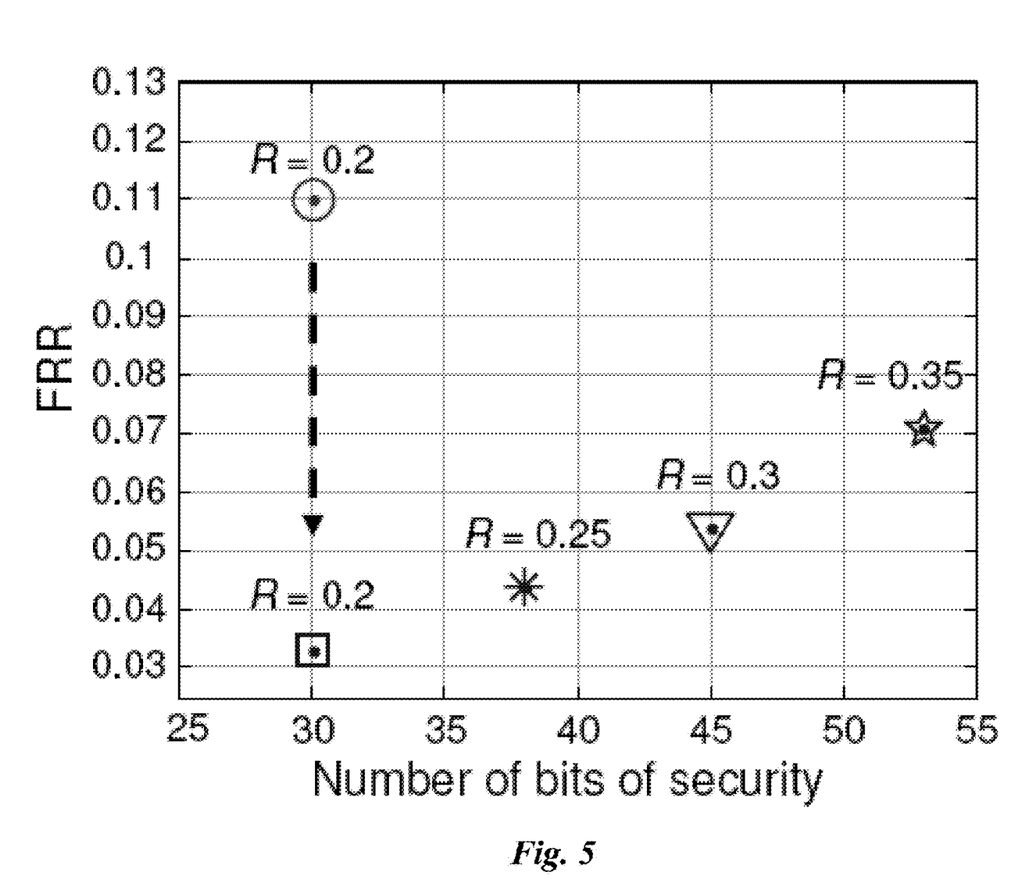
FIG. 5 is graph comparing a false reject rate as a number of bits of security.

Because there is a considerable reduction in the FRR, at a very low FAR, it is now possible to trade off reliability and number of bits security as shown in FIG. 5 for shuffled BP decoding with soft initialization of LLRs, and reliable bits in high-degree variable nodes. By increasing the coding rate from 0.2 to 0.35, the number of bits of security increases from 30 to 53, while the FRR increases from 3.3% to 7%.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for authenticating biometric data; comprising a processor for performing steps of the method, comprising the steps of:
measuring a reliability of each bit in enrollment biometric data, wherein the reliability is measured in terms of a crossover probability of a corresponding binary symmetric channel, wherein for the crossover probability p, the reliability $$R = \left| \log\left(\frac{1-p}{p}\right) \right|.$$

arranging the bits in the enrollment biometric data in a decreasing order of the reliability of each bit and associating bits with code components according to associated reliabilities;
encoding the enrollment biometric data in the decreasing order to produce an enrollment syndrome;
arranging the bits in the authentication biometric data in the decreasing order of the reliability of each bit and associating bits with code components according to the associated reliabilities;
decoding the authentication biometric data in the decreasing order using the enrollment syndrome and a syndrome decoder and to produce an estimate of the enrollment biometric data; and
generating an output signal indicating whether the estimate of the authentication biometric data is substantially the same as the enrollment biometric data.

2. The method of claim 1, wherein the output signal provides secure access to a computer system, stored data or a facility.

3. The method of claim 1, wherein the biometric data are for a fingerprint.

4. The method of claim 1, wherein the biometric data are for an iris.

5. The method of claim 1, wherein the biometric data are for a face.

6. The method of claim 1, wherein the biometric data are for a speech signal.

7. The method of claim 1, further comprising:
matching the biometric data to an error correcting code.

8. The method of claim 7, wherein the encoding and decoding use Slepian-Wolf coding.

9. The method of claim 1, wherein the measuring considers a false accept rate, a false reject rate, receiver operating characteristic, crossover error rate, failure to enroll rate, successful attack rate, number of bits of security, or combinations thereof.

10. The method of claim 1, wherein the encoding and decoding uses a low-density parity check (LDPC) code with code components including variable nodes and check nodes in code graph.

11. The method of claim 10, wherein the decoding uses belief propagation represented by a bipartite graph including variable nodes connected to check nodes, and wherein a number of the check nodes connected to each variable node is a degree of the variable node, and further comprising:
arranging the variable nodes in a decreasing order of the degree; and
assigning the bits of authentication biometric data to the variables nodes in the decreasing order.

12. The method of claim 11, further comprising:
assigning a log likelihood ratios (LLR) to the variable nodes in the decreasing order.

13. The method of claim 12, further comprising:
initializing each LLR to $$L_j = \begin{cases} R_j & \text{if } b_j = 1 \\ -R_j & \text{if } b_j = 0, \end{cases}$$

where j is an index of a bit in the authentication biometric data.

14. The method of claim 11, wherein the belief propagation is shuffled.

* * * * *